Jan. 18, 1949.  G. D. ELLIS  2,459,418
LIGHT SPOT AND REFLECTOR MEANS FOR ALINEMENT
OF CAMERAS FOR TITLE PURPOSES
Filed Dec. 8, 1945
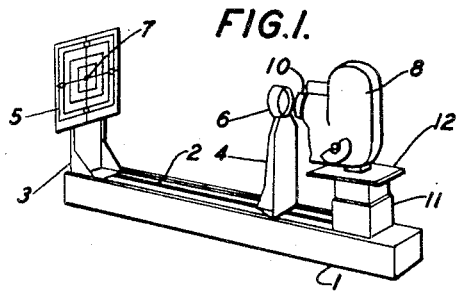
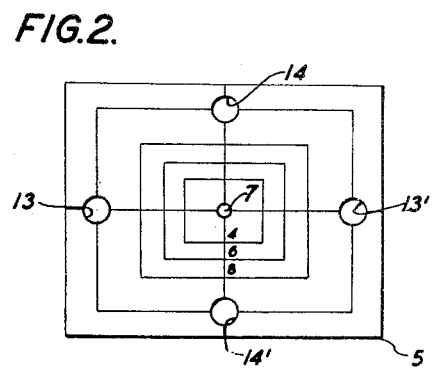
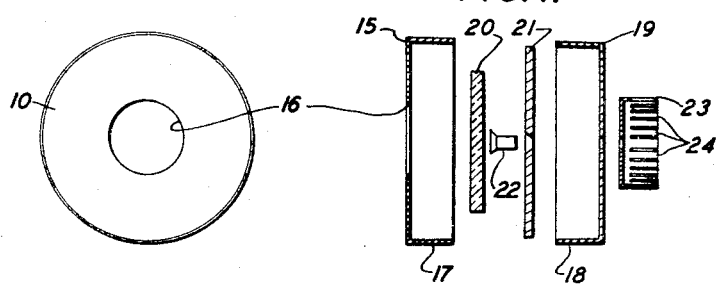
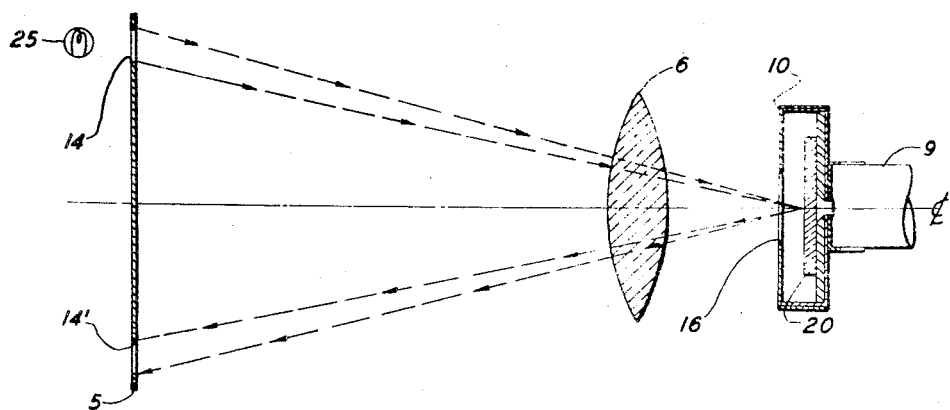
INVENTOR.
GEORGE D. ELLIS
BY *Earl E. Moore*
ATTORNEY Patented Jan. 18, 1949

2,459,418

UNITED STATES PATENT OFFICE 2,459,418

LIGHT SPOT AND REFLECTOR MEANS FOR ALIGNMENT OF CAMERAS FOR TITLE PURPOSES

George D. Ellis, Los Angeles, Calif.

Application December 8, 1945, Serial No. 633,610

4 Claims. (Cl. 88—24)

This invention relates to means and ways for centering the lens of a camera with a chart, card, mask, etc., and especially therewith when various loci of close foci are necessary. The invention is especially suitable for alining titles, etc., at close range for still and movie cameras and has been found very desirable for 8 and 16 mm. movie cameras.

The device illustrated has been designed in accordance with sound scientific principles and has been constructed to be extremely simple and easy to use, but, nevertheless, to give accuracy in perfect camera alinement with its target. By the use of such a device, errors of alinement can readily be discovered before risking the waste of film and obviously much time saved as compared to the old trial and test methods.

One of the principal objects of this invention is to present a new and novel means and method for alining pictorial subjects at close range with the lens of a camera, the means for accomplishing this involving a lens cap which is secured temporarily to the lens front of a camera and which has fixed thereto a reflector that is capable of reflecting a light spot from one portion of the subject to another portion thereof, the position of the light spots determining whether or not the camera lens is properly alined with the subject when the subject is to be pictured.

Another object of this invention is to provide a lens cap in combination with a printed target, the lens cap including a reflector and the target a source of light spot, the spot being reflected from the target back to the target by the reflector so that when the axis of the lens is normal to the plane of the subject or target card, the angle of reflection will exactly equal the angle of incidence so that the position of the light spot source and the reflected spot will be exactly equally spaced from the center of the subject or card.

Still another object is to provide a camera reflector device in combination with a chart device that is adapted to indicate the alinement of a camera lens with the center of the chart, the devices being simple and sturdy in construction, easy to position and adjust, and economical to make and manufacture.

Other objects, advantages and features of my invention will appear from the accompanying drawings, the subjoined detailed description, the preamble of these specifications and the appended claims.

Applicant is about to illustrate and describe one of the forms of his invention in order to teach one how to make, and use the same, but it is to be understood that the drawings and description thereof are not to limit the invention in any sense whatsoever, except as limited by the appended claims.

In the drawings:

Fig. 1 is a perspective view, on a small scale, of an apparatus adapted to employ the invention, the invention being applied to the apparatus and ready for use in combination therewith.

Fig. 2 is an elevational view of a target card which is employed in the invention, Fig. 3 is a front elevational view of a reflector device employed in the invention, Fig. 4 is an exploded view of the reflector device showing the parts in vertical sectional view, Fig. 5 is an enlarged view on a vertical plane of the important parts of the invention showing how they cooperate to accomplish the objects of this invention.

The form of the invention as illustrated in the drawings, comprise an elongated base element 1 which is provided along its top surface with a depresssed track 2 in which can slide the target standard 3 and an auxiliary lens standard 4. The target standard supports a target card 5 which may be attached thereto in any suitable manner and held in a fixed position when once levelled and plumbed. The standard 4 supports an auxiliary lens 6, the axis of which is intended to be exactly on a line with the center 7 of the target card.

At one end of the base 1, is supported a camera 8 having a lens front casing 9 upon which is detachably supported a reflector unit 10. The camera shown is of the 8 mm. or 16 mm. type movie camera, but it is to be understood that this invention can be very useful when employed with any type of camera or projector. The camera is supported by a standard 11 and the plate 12 at the top thereof. Any suitable means may be employed for resting or supporting the camera upon the plate 12 so that it will not fall or be easily moved from its adjusted position. However, if so desired, the plate 12 may be of the adjustable type which can be readily levelled by adjusting a few thumb screws, but since the detailed means of supporting the camera is not relied upon for novelty, no further explanation thereof will be made.

The target card is lined as shown for purposes of arranging lettering, etc., which is to be photographed. At each side of the card there is a hole numbered 13 and 13', and at the top and bottom of the card are the holes 14 and 14' respectively. The manner of employing these holes will be explained later.

The reflector unit 10 comprises the front piece 15 which is provided with the aperature 16 and an annular flange 17 which is adapted to snugly surround or telescope a similar flange 18 on the rear piece 19. The two pieces form a chamber within which is a mirror 20, a spacer 21 of suitable material and a rivet 22. The rivet passes through a hole in the center of the spacer and the rear piece, and also through the center of the spring flanged attachment element 23 where the end of the rivet is pressed to form a holding head and thus securely hold the spacer and the element 23 together. The mirror is cemented to the spacer or otherwise suitably held thereto. The two pieces 15 and 19 have their flanges forced together so as to overlap and make a good friction connection, but the flanges may be soldered if so desired. The spacer 21 may be omitted, if desired, but this spacer is, however, believed an aid toward protecting and positioning the mirror. The element 23 has a large number of spring metal strips 24 which snugly engage the outer surfaces of the lens casing of a camera in the well known manner.

When the target card, auxiliary lens, reflector unit, and camera front lens are arranged as illustrated in Fig. 5, the camera lens is ready to be set so as to be properly alined with the center of the target card 5, or any other point on the card should some other point be preferred.

A small light of any type indicated at 25 may be used, or if preferred, the sun may be employed as a source of light. In any event, the light source directs its rays from the back of the card through one of the holes, the hole in this particular case is the one indicated at 14. It is somewhat helpful to mask all the holes except the one being used by the light source by a piece of paper in that it helps one to more easily spot the reflected light. The spot of light or incident ray from the source is passed through the auxiliary lens and then to the reflector unit, the mirror 20 reflecting the ray back to the card where the light spot should be near the hole 14'; this is for vertical alinement, but for horizontal alinement, the hole 13 may be used for the light source and the hole 13' for the reflected spot.

Obviously, should the reflected light not strike the hole 14', the camera is not set true so that its lens center will strike the card center in a vertical direction, therefore, the camera is shimmed or the table level changed until the reflected spot strikes the center of the hole 14'. Likewise, the camera is also shimmed when the horizontal alinement is being made in a similar fashion. When the lens of the camera is accurately centered with respect to the target card 5, the holes opposite the holes which provide the light will be neatly spotted by the reflected light from the reflector unit. Sometimes correction can be made without disturbing the camera by simply rotating the auxiliary lens in its holder, and this is because the optical center of the auxiliary lens may not be exactly at its physical center.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims:

Note, that the center 7 of the card is provided with an opening, which opening is also for the purpose of alining the camera lens with the center of the card, and which opening may be preferred under certain circumstances instead of using the other openings. When the center opening is used, the light is placed behind it and the rays reflected back to the card by the reflector. When the reflected ray is exactly spotted at the center hole, the camera lens is alined with the center of the card.

Having thus described my invention, what is claimed as new and desired to be secured by Letters Patent is:

1. In a device for photographing titles, the device including an elongated base with a camera lens supported at one end and a target card with lines forming rectangles supported at the other end, the axis of the lens and the center of the card being substantially in alinement, a removable cap attached to the lens and having a mirror therein which is perpendicular to the axis of the lens and in a plane which is parallel to the plane of the card, an aperture in a predetermined position along one of the lines on the card through which light rays can pass and be directed to the mirror and reflected back onto the card to an opposite line for lens alining purposes.

2. The device recited in claim 1 wherein the base is slotted and has a target card supporting base therein which is adapted to slide in the slot so that the target can be adjusted in its distance from the lens, and a source of light behind the aperture.

3. The device recited in claim 1 wherein the cap consists of a pair of interfitting cup-like elements which provide a chamber, one of the elements having an aperture therein and the other element supporting the mirror which is positioned to reflect light through this aperture.

4. In a device for alining a camera with a target card and the like for making title shots, the device including an elongated base with a camera supporting means at one end thereof, an upright card supporting means at the other end thereof, and an auxiliary lens supporting means intermediate the ends thereof, a camera on its said supporting means having a lens with a removable cap attached thereto, an auxiliary magnifying lens on its said supporting means and an upright target card on its said supporting means which is alined with both lenses, said cap having a mirror therein which is perpendicular to the axis of the camera lens, the card having its working surface marked with rectangular guide areas and spaced from and parallel to the plane of the mirror, and an aperture in a predetermined off-center position on the card through which light rays can pass and be directed to the mirror and thence reflected onto the card for the purposes described.

GEORGE D. ELLIS.

REFERENCES CITED

The following references are of record in the file of this patent:

UNITED STATES PATENTS

| Number | Name | Date |
|---|---|---|
| 200,836 | Martens | Mar. 5, 1878 |
| 877,283 | Barrath | Jan. 21, 1908 |
| 1,513,734 | Beatty | Nov. 4, 1924 |
| 1,590,532 | Lenouvel | June 29, 1926 |
| 1,709,598 | Simjian | Apr. 16, 1929 |
| 1,933,817 | Miller et al. | Nov. 7, 1933 |
| 1,992,068 | Gwozdecki | Feb. 19, 1935 |
| 2,187,582 | Anderson | Jan. 16, 1940 |
| 2,235,355 | Brown | Mar. 18, 1941 |
| 2,346,096 | Whitaker | Apr. 4, 1944 |
| 2,352,179 | Bolsey | June 27, 1944 |
| 2,402,856 | Turrettini | June 25, 1946 |
| 2,410,339 | Creagmile | Oct. 29, 1946 |

FOREIGN PATENTS

| Number | Country | Date |
|---|---|---|
| 558,510 | Great Britain | Jan. 7, 1944 |